(12) United States Patent
Srivastava et al.

(10) Patent No.: US 8,635,366 B2
(45) Date of Patent: Jan. 21, 2014

(54) COMMUNICATION ROUTING

(75) Inventors: Bhavuk Srivastava, Magarpatta (IN);
Sagar Joshi, Deccan Gymkhana (IN);
Anuradha Malvadkar, Pune (IN);
Supal Patel, Pleasanton (CA)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/482,810

(22) Filed: Jun. 11, 2009

(65) Prior Publication Data
US 2010/0318676 A1    Dec. 16, 2010

(51) Int. Cl.
*G06F 15/173* (2006.01)

(52) U.S. Cl.
USPC ........... 709/238; 709/200; 709/206; 340/539; 379/913

(58) Field of Classification Search
USPC ............ 709/200, 206, 238; 340/539; 379/913
See application file for complete search history.

(56) References Cited

U.S. PATENT DOCUMENTS

| | | | | |
|---|---|---|---|---|
| 5,243,645 | A | * | 9/1993 | Bissell et al. ............ 379/211.02 |
| 5,465,082 | A | * | 11/1995 | Chaco ...................... 340/539.13 |
| 5,479,408 | A | * | 12/1995 | Will .............................. 370/313 |
| 5,493,692 | A | * | 2/1996 | Theimer et al. .............. 455/26.1 |
| 5,561,412 | A | * | 10/1996 | Novak et al. ............. 340/286.07 |
| 5,588,009 | A | * | 12/1996 | Will ............................... 714/749 |
| 5,699,038 | A | * | 12/1997 | Ulrich et al. ............. 340/286.07 |
| 5,838,223 | A | * | 11/1998 | Gallant et al. ............ 340/286.07 |
| 5,970,388 | A | * | 10/1999 | Will .............................. 455/458 |
| 6,009,333 | A | * | 12/1999 | Chaco ......................... 455/456.5 |
| 6,047,327 | A | * | 4/2000 | Tso et al. ........................ 709/232 |
| 6,157,945 | A | * | 12/2000 | Balma et al. .................. 709/206 |
| 6,894,612 | B2 | * | 5/2005 | Xydis ....................... 340/539.11 |
| 7,016,675 | B1 | * | 3/2006 | Schuster et al. .............. 455/433 |
| 7,272,662 | B2 | * | 9/2007 | Chesnais et al. ............. 709/246 |
| 7,298,833 | B2 | * | 11/2007 | Klein et al. ............. 379/201.02 |
| 7,489,774 | B2 | * | 2/2009 | Agrawal et al. ........... 379/211.02 |
| 7,606,580 | B2 | * | 10/2009 | Granito et al. ............. 455/456.1 |
| 7,627,334 | B2 | * | 12/2009 | Cohen et al. ............... 455/456.3 |
| 7,849,136 | B2 | * | 12/2010 | Cho et al. ....................... 709/204 |
| 8,023,965 | B2 | * | 9/2011 | Michaud .................... 455/456.1 |
| 8,140,061 | B2 | * | 3/2012 | Ricci .............................. 455/417 |
| 8,311,887 | B2 | * | 11/2012 | Tsou et al. .................. 705/14.57 |
| 2001/0000958 | A1 | * | 5/2001 | Ulrich et al. .................. 340/539 |
| 2004/0098464 | A1 | | 5/2004 | Koch et al. |

(Continued)

OTHER PUBLICATIONS

"Ubiquitous Presence Systems" Matthias Kranz, Paul Holleis, Albrecht Schmidt, Research Group Embedded Interaction. http://www.hcilab.org/documents/KranzHolleisSchmidt_UbiquitousPresenceSystems_ACMSAC2006.pdf.

(Continued)

*Primary Examiner* — Anthony Mejia
(74) *Attorney, Agent, or Firm* — Holland & Knight LLP; Brian J. Colandreo, Esq.; Jeffrey T. Placker, Esq.

(57) ABSTRACT

Disclosed a method for routing communication for an individual. The method involves the steps receiving access control information system for the individual to identify the location of the individual. A communication server, such as a soft phone system or and instant messaging client, is updated according to the current location of the individual. In this way the communication server may be configured to route communication to the current location of the individual. Alternatively, the current location of the individual may be displayed in a client device of the communication server, such as a telephone handset or Instant Messaging Client.

18 Claims, 5 Drawing Sheets

(56) References Cited

U.S. PATENT DOCUMENTS

| | | | |
|---|---|---|---|
| 2004/0099731 A1* | 5/2004 | Olenick et al. | 235/380 |
| 2004/0170154 A1* | 9/2004 | Carter et al. | 370/338 |
| 2004/0172455 A1* | 9/2004 | Green et al. | 709/207 |
| 2004/0172456 A1* | 9/2004 | Green et al. | 709/207 |
| 2004/0193449 A1* | 9/2004 | Wildman et al. | 705/2 |
| 2004/0203695 A1 | 10/2004 | Mikan | |
| 2004/0250212 A1 | 12/2004 | Fish | |
| 2004/0267887 A1 | 12/2004 | Berger et al. | |
| 2005/0085257 A1* | 4/2005 | Laird et al. | 455/550.1 |
| 2005/0130634 A1* | 6/2005 | Godfrey | 455/414.1 |
| 2005/0143098 A1* | 6/2005 | Maillard | 455/456.5 |
| 2005/0151641 A1* | 7/2005 | Ulrich et al. | 340/539.13 |
| 2006/0005133 A1* | 1/2006 | Lyle et al. | 715/708 |
| 2006/0075039 A1* | 4/2006 | Narayanaswami et al. | 709/206 |
| 2006/0075056 A1* | 4/2006 | Isaacs et al. | 709/206 |
| 2006/0092015 A1* | 5/2006 | Agrawal et al. | 340/539.13 |
| 2006/0093117 A1* | 5/2006 | Agrawal et al. | 379/211.01 |
| 2006/0093118 A1* | 5/2006 | Agrawal et al. | 379/211.02 |
| 2006/0255129 A1* | 11/2006 | Griffiths | 235/382 |
| 2007/0153794 A1* | 7/2007 | Smith et al. | 370/390 |
| 2007/0201421 A1* | 8/2007 | Huseth | 370/338 |
| 2007/0225017 A1* | 9/2007 | Li et al. | 455/456.1 |
| 2007/0260730 A1 | 11/2007 | Gadwale | |
| 2007/0288852 A1 | 12/2007 | Fish | |
| 2008/0005119 A1* | 1/2008 | Fernandez et al. | 707/10 |
| 2008/0094217 A1* | 4/2008 | Okamasu et al. | 340/572.1 |
| 2008/0133580 A1 | 6/2008 | Wanless et al. | |
| 2008/0291022 A1* | 11/2008 | Amador et al. | 340/572.1 |
| 2009/0006555 A1* | 1/2009 | Curran et al. | 709/206 |
| 2009/0028318 A1* | 1/2009 | Bhogal et al. | 379/211.02 |
| 2009/0047972 A1* | 2/2009 | Neeraj | 455/456.1 |
| 2009/0076969 A1* | 3/2009 | Sparks | 705/80 |
| 2009/0098878 A1* | 4/2009 | Agrawal et al. | 455/445 |
| 2009/0131080 A1* | 5/2009 | Nadler et al. | 455/456.3 |
| 2009/0172105 A1* | 7/2009 | Cruz et al. | 709/206 |
| 2009/0280827 A1* | 11/2009 | Michaud | 455/456.1 |
| 2010/0016745 A1* | 1/2010 | Crump et al. | 600/519 |
| 2010/0036928 A1* | 2/2010 | Granito et al. | 709/206 |
| 2010/0130228 A1* | 5/2010 | Vendrow et al. | 455/456.1 |
| 2010/0151845 A1* | 6/2010 | Rountree | 455/417 |
| 2010/0184400 A1* | 7/2010 | Brackett et al. | 455/404.2 |
| 2010/0184401 A1* | 7/2010 | Spence | 455/404.2 |
| 2010/0217618 A1* | 8/2010 | Piccirillo et al. | 705/2 |
| 2010/0240343 A1* | 9/2010 | Russell | 455/411 |
| 2010/0279712 A1* | 11/2010 | Dicke et al. | 455/456.5 |
| 2011/0183645 A1* | 7/2011 | Chawla | 455/410 |

OTHER PUBLICATIONS

"The Active Badge Location System" Roy Want, Andy Hopper, Veronica Falcão and Jonathan Gibbons Olivetti Research Ltd. (ORL)http://web.media.mitedu/~dmerrill/badge/Want92_ActiveBadge.pdf.

* cited by examiner

COMMUNICATION ROUTING

TECHNICAL FIELD

Embodiment of the invention relate to the filed of communication routing.

BACKGROUND

Tracking down the location of an individual within a large enterprise such as a hospital, manufacturing unit or globally distributed organization is typically a difficult task. For instance, in a hospital, should there be an emergency it would be essential to ascertain the location of a particular doctor and contact the doctor on an immediate basis, as quickly as possible. Again, in manufacturing units or globally distributed organizations, there is a need and the ability to locate an individual quickly increases productivity.

For example, an individual within an organisation may be contacted using a telephone contact number. However, should that individual be away from the desk or specified location, it may not be possible to contact that individual telephonically. Now-a-days, mobile phones are useful for contacting individuals who is on the move, but again unfortunately not everyone carries a mobile phone.

Furthermore, another easy way to contact individuals within an organisation is via an instant messaging client. Should that individual be away from his desk, the instant messaging client is typically configured to reflect the status of the individual as being 'away' but provides no further indication of the individual's location, unless the user specifies where they may be available depending on the current program conditions, which may not be the specified location to find the user as these conditions are subject to change dynamically.

A need therefore exists, for a location tracking system to substantially overcome, or at least ameliorate, one or more disadvantages of existing arrangements.

SUMMARY

According to a first aspect thereof, is provided a method for routing communication to an individual. The method comprises the steps of receiving access control information for the individual, identifying the current location of the individual from the access control information, receiving communication for the individual and routing the communication to the current location of the individual.

According to further aspect, there is provided a system for routing communication to an individual. The system comprises a location tracking server, the location tracking server is configured to receive access control information. The system also comprises a communication server; the communication server is configured to receive communication for the individual. The location tracking server converts the access control information into the current location of the individual. The communication server receives the current location of the individual and routes the communication for the individual to the current location of the individual.

BRIEF DESCRIPTION OF THE DRAWINGS

Embodiments of the invention are illustrated by way of example and not limitation in the figures of the accompanying drawings

DETAILED DESCRIPTION

As will be appreciated by one skilled in the art, the disclosure may be embodied as a system, method or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a standalone software package, partly on the user's computer or data processing system and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
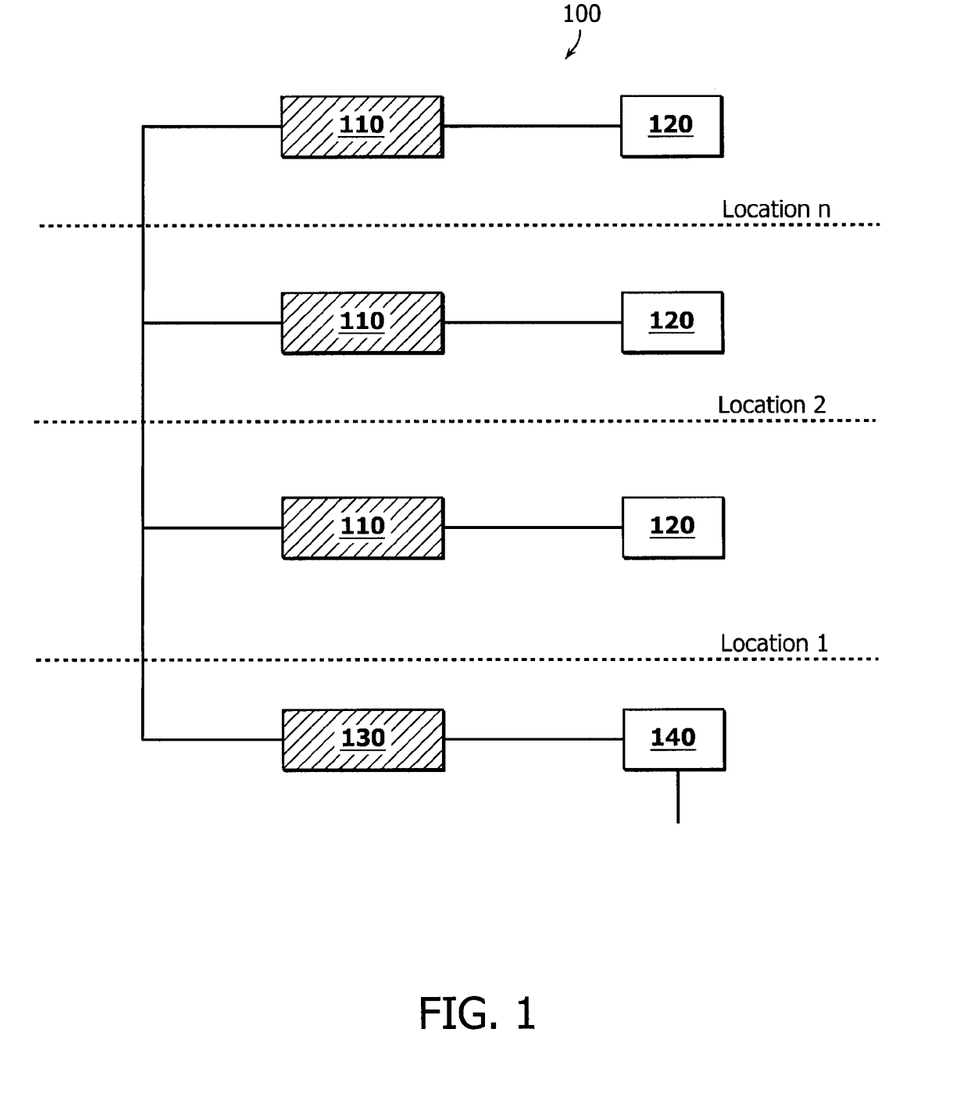
FIG. 1 illustrates an exemplary embodiment of a general hardware arrangement of an example access control system 100.

FIG. 1 illustrates an exemplary embodiment of a general hardware arrangement of an example access control system 100. The access control system 100 may span one or more locations with head-end hardware and software located in a security control room. Each location contains an access control panel 110 that interface with the plurality of local access control devices 120. The set of access control devices 120 include proximity card readers, magnetic swipe card readers, keypad devices and biometric scanners. The access control panels 110 interface with an access control board 130 in the security control room. The access control board 130 interfaces with an access control computer 140. The access control computer 140 may contain a database comprising individual information, location information or access privilege mappings. The access control computer 140 may also be accessible via the LAN 150, typically by means of a second network interface card.

Figure 2:
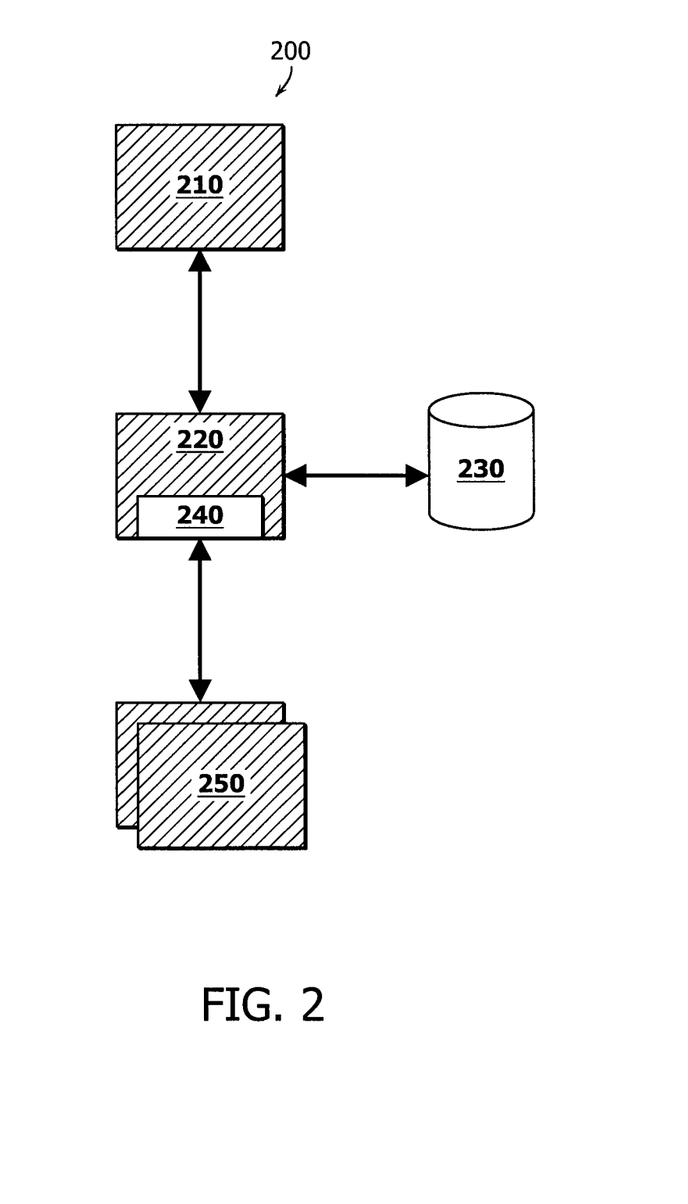
FIG. 2 illustrates an exemplary embodiment of a software components of the location tracking system 200.

FIG. 2 illustrates an exemplary embodiment of a software components of the location tracking system 200. The system 200 comprises an access control server 210 which operates on the access control computer 140. The access control computer 140 interfaces with the access control board 130 and access control panels 110 to read information from the access control devices 120, grant privileges and write outputs to the appropriate access control actuators. The system 200 contains a location tracking server 220. The location tracking server 220 may also execute on the access control computer 140 or any other computer accessible via the LAN 150. The location tracking server 220 interfaces with the access control server 210 to read access control data for the purposes of location tracking. The location tracking server 220 may make use of an access control server 210 application programming interface (API) to read the access control data. As such, the location tracking server 220 may be configured to poll the access control server 210 API at regular intervals or the location tracking server 220 may be configured to respond to an access control update event of the access control server 210.

The location tracking server 220 is able to ascertain the locations of individuals within the access control system 110. For example, should individual with individualID #001 enter a location with locationID #AAA, and this information will be reflected in the access control server 210. The location tracking server 220 is then able to receive the information that individual #001 has entered located #AAA. The location tracking server 220 may be connected to a database 230 which contains lookup tables for converting the individualID into the identity of the individual and the locationID into the location of the individual. For example, the location tracking server is able to translate individualID #001 into Joe Soap and resolve the locationID #AAA into Operating Ward 3 with telephone number 740 6559. In another example, the location tracking server 220 may receive information that an individual with individualID #002 has entered a location with locationID #AAB and infer using the look up information in the database 230 that Joe Blogs has entered the canteen.

The location tracking server 220 may contain an API 240 for making the location tracking information available. The system 200, may contain a plurality of communication servers 240. An example of a communication server may be a soft phone system by CISCO™ Systems or an instant messaging server by Microsoft™ Corporation. The location tracking server API 240 may be implemented by Web Services or Microsoft™.Net Remoting. In this manner, when an individual changes his location, the communication servers may be updated to reflect the new location of the individual. For example, the soft phone system may automatically update the telephone number for an individual when the individual changes location. This way, a telephone call to the individual will be redirected to the phone closest to his location. Similarly, the instant messaging server 250 may update the plurality of instant messaging clients to reflect the current location of the individual. Therefore, instead of the status of an individual in an instant messaging client simply reflecting 'away', the instant messaging client may reflect for example 'in the canteen'.

Figure 3:
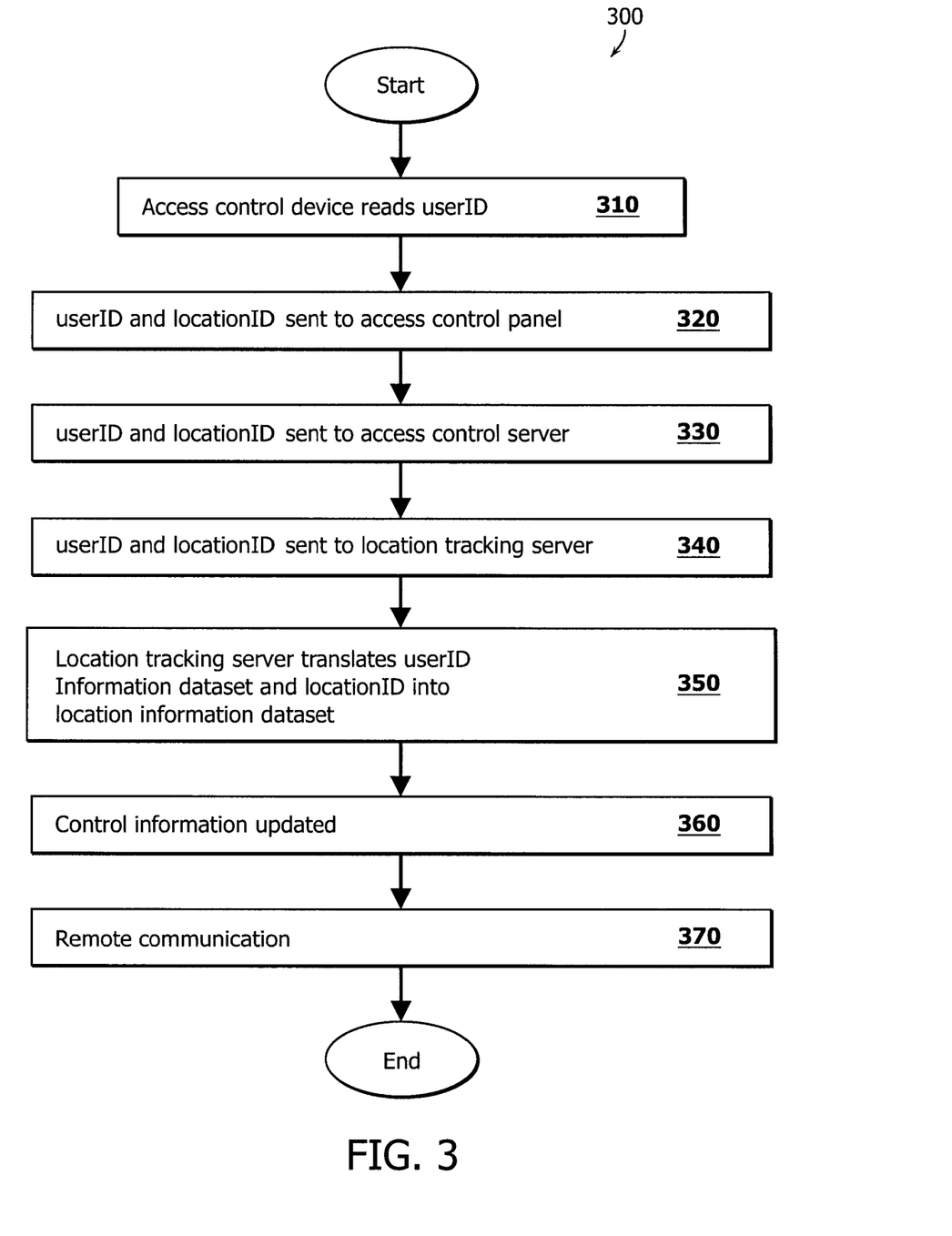
FIG. 3 illustrates an exemplary embodiment of a method 300 for updating the individual's location in a communication server

FIG. 3 illustrates an exemplary embodiment of a method 300 for routing communication to an individual. The method 300 begins at step 310 where an access control device 120 reads an individualID. The individualID may be stored within the access device carried by the individual, such as proximity card, magnetic swipe card or barcode. Alternatively, the individualID may be or may be information entered into the access control device 120 by the individual such as a four digit password or biometric information such as a fingerprint.

At step 320, the individualID is sent to the access control panel 110. Additionally, the locationID is sent to the access control panel 110. The locationID is identifies the location of the access control device 120. At step 330, the individualID and locationID are sent to the access control server 210 in the access control computer 140 via the access control board 130. At step 340, the individualID and locationID are sent to the location tracking server 220 executing on the access control computer 140. The location tracking server 220 may obtain the individualID and locationID information from the access control server 210 as a result of a polling request or as a response to a location update event. The location tracking server 220 reads information contained in the database 230 to translate the individualID into the identity of the individual. For example, the database 230 may contain a database table where individualID is a primary index and a number of columns exist to contain individual information such as first name and last name of the individual. Additionally, the location tracking server 220 uses the database 230 to translate the locationID into the location of the individual. Similarly, the database 230 may contain a database table with the locationID as the primary index and a number of columns exist to contain the location information such as the name of the location, and the telephone number of a telephone within that location.

Once the location tracking server 220 has resolved the individual information and location information, it makes the information available via its API 240. At step 360, a communication server 250 reads the individual information and location information from the location tracking server API 240. The communication server may poll the API 240 on a continual basis or receive a location update event from the API 240.

Once the communication server has received the location tracking update information it may configure the contact information applicable to the relevant individual. For example, the telephone contact information for an individual may be automatically updated to the telephone number of the telephone closest to the individual.

The communication server may notify one or more communication clients to indicate the current location of the individual. For example, where the communication server is a soft phone implementation, one or more telephone handsets could display the current location of the individual on an LCD display device of the telephone handset.

Similarly, the instant messaging server may notify one or more instant messaging clients with the name of the individual's location.

At step 370, the communication server may route communication for an individual according to the location of the individual. For example, where the communication server is a softphone implementation, the communication server may be configured to route a telephone call to a telephone handset closest to the individual. If the individual is not near a handset, the communication server may be configured to play back an appropriate message informing the caller that the individual is not near a handset.

Where the communication server is an Instant Messaging Server, the communication server may be configured to convert a text message communication for the individual into speech. The speech may then be directed to a telephone handset or speaker at the current location of the individual for playback. Alternatively, the text message may be converted into Short Message Service (SMS) format and sent to the individual's mobile phone.

Figure 4:
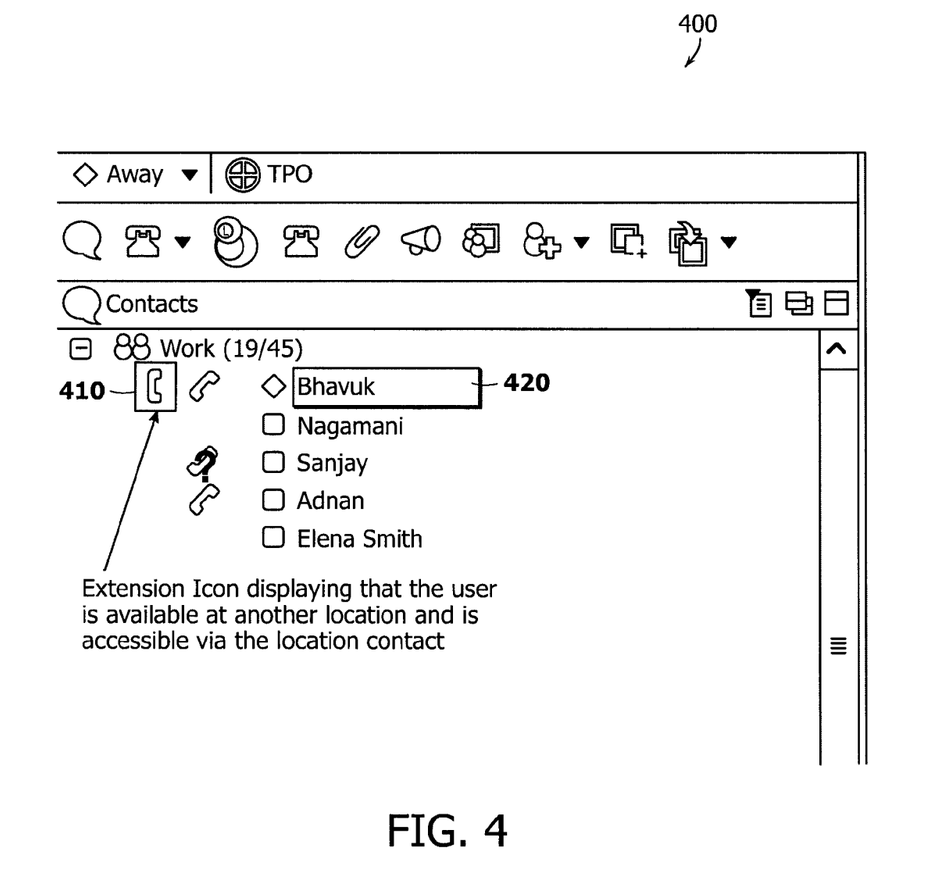
FIG. 4 illustrates an exemplary embodiment of an instant messaging (IM) client 400.

FIG. 4 illustrates an exemplary embodiment of an instant messaging (IM) client 400. The IM client 400 displays screen names of one or more 'buddies' related to other IM individuals connected to the same IM server 250. If an individual is away from their desk, their current location 420, as resolved by the location tracking server 220, may be displayed next to the screen name of the individual. If an individual is in a location that has a telephone handset nearby, an icon 410 may be displayed next to the screen name of the individual. Activating the icon 410 may initiate a call to the telephone or may display the telephone number of the telephone.

Figure 5:
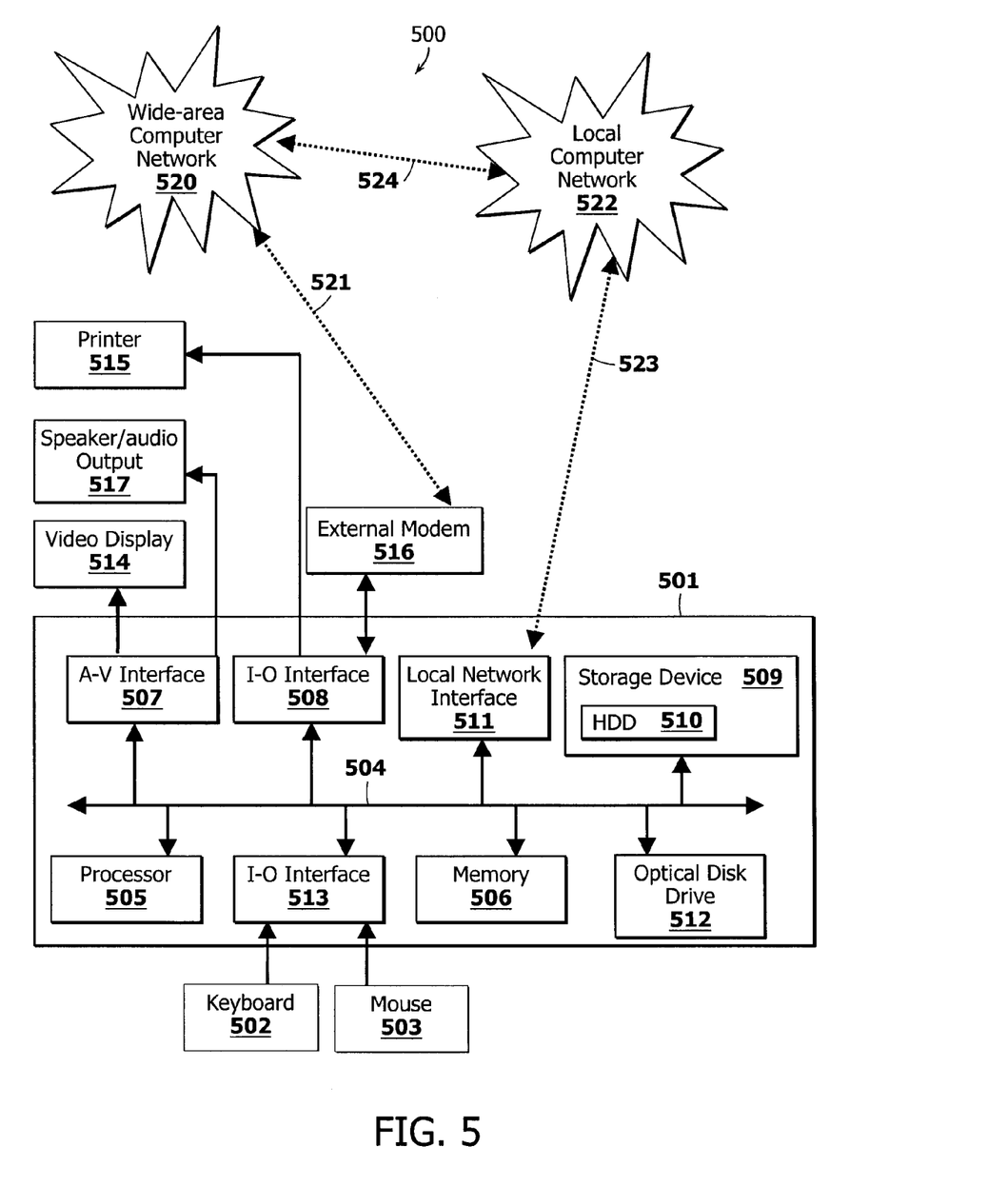
FIG. 5 illustrates an exemplary embodiment of a data processing system 500 for updating the individual's location in a communication server.

The location tracking server may be implemented as software, such as one or more application programs executable within the computer system or data processing system 500, such as that illustrated in an exemplary embodiment in FIG. 5. For example, such computer system comprise a desktop computer, a laptop computer, a server, a pocket PC, a PDA, a mobile phone etc. Furthermore the instant messaging client may be implemented as software such as one or more application programs executable within the computer system 500. The instructions may be formed as one or more code modules, each for performing one or more particular tasks. The software may be stored in a computer readable medium, including the storage devices described below, for example. The software is loaded into the computer system 500 from the computer readable medium, and then executed by the computer system 500. A computer readable medium having such software or computer program recorded on it is a computer program product.

As seen in FIG. 5, the computer system 500 is formed by a computer module 501, input devices such as a keyboard 502 and a mouse pointer device 503, and output devices including a printer 515, a display device 514 and loudspeakers 517. An external Modulator-Demodulator (Modem) transceiver device 516 may be used by the computer module 501 for communicating to and from a communications network 520 via a connection 521. Such a communication network, may be a wired network, a wireless network or a combination thereof. The network 520 may be a wide-area network (WAN), such as the Internet or a private WAN. Where the connection 521 is a telephone line, the modem 516 may be a traditional "dial-up" modem. Alternatively, where the connection 521 is a high capacity (eg: cable) connection, the modem 516 may be a broadband modem. A wireless modem may also be used for wireless connection to the network 520.

The computer module 501 typically includes at least one processor unit 505, and a memory unit 506 for example formed from semiconductor random access memory (RAM) and read only memory (ROM). The module 501 also includes an number of input/output (I/O) interfaces including an audio-video interface 507 that couples to the video display 514 and loudspeakers 517, an I/O interface 513 for the keyboard 502 and mouse 503 and optionally a joystick (not illustrated), and an interface 508 for the external modem 516 and printer 515. In some implementations, the modem 516 may be incorporated within the computer module 501, for example within the interface 508. The computer module 501 also has a local network interface 511 which, via a connection 523, permits coupling of the computer system 500 to a local computer network 522, known as a Local Area Network (LAN). As also illustrated, the local network 522 may also couple to the wide network 520 via a connection 524, which would typically include a so-called "firewall" device or similar functionality. The interface 511 may be formed by an Ethernet™ circuit card, a wireless Bluetooth™ or an IEEE 802.11 wireless arrangement.

The interfaces 508 and 513 may afford both serial and parallel connectivity, the former typically being implemented of the Universal Serial Bus (USB) standards and having corresponding USB connectors (not illustrated). Storage devices 509 are provided and typically include a hard disk drive (HDD) 510. Other devices such as a floppy disk drive and a magnetic tape drive (not illustrated) may also be used. An optical disk drive 512 is typically provided to act as a non-volatile source of data. Portable memory devices, such optical disks (eg: CD-ROM, DVD), USB-RAM, and floppy disks for example may then be used as appropriate sources of data to the system 500.

The components 505 to 513 of the computer module 501 typically communicate via an interconnected bus 504 and in a manner which results in a conventional mode of operation of the computer system 500 known to those in the relevant art. Examples of computers on which the described arrangements can be practiced include IBM-PC's and compatibles, Sun Sparcstations, Apple Mac™ or like computer systems evolved therefrom.

Typically, the application programs discussed above are resident on the hard disk drive 510 and read and controlled in execution by the processor 505. Intermediate storage of such programs and any data fetched from the networks 520 and 522 may be accomplished using the semiconductor memory 506, possibly in concert with the hard disk drive 510. In some instances, the application programs may be supplied to the user encoded on one or more CD-ROM and read via the corresponding drive 512, or alternatively may be read by the user from the networks 520 or 522. Still further, the software can also be loaded into the computer system 500 from other computer readable media. Computer readable media refers to any storage medium that participates in providing instructions and/or data to the computer system 500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 514. Through manipulation of the keyboard 502 and the mouse 503, a user of the computer system 500 and the application may manipulate the interface to provide controlling commands and/or input to the applications associated with the GUI(s).

Method 300 may alternatively be implemented in dedicated hardware such as one or more integrated circuits performing the functions or sub functions of FIG. 2. Such dedicated hardware may include graphic processors, digital signal processors, or one or more microprocessors and associated memories.

The foregoing describes only some embodiments of the invention, and modifications and/or changes can be made thereto without departing from the scope and spirit of the invention, the embodiments being illustrative and not restrictive.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

What is claimed is:

1. A method for routing a first communication to an individual, the method comprising:
   receiving, by a location tracking server, access control information from an access control server, wherein the access control information comprises a user ID and a location ID;
   converting, by the location tracking server, the access control information into location tracking information including an identity of the individual and a current location of the individual, the converting including converting the user ID into the identity of an individual and the location ID into the current location of the individual;
   making, by the location tracking server, the location tracking information available to one or more other entities including a communication server operative to route the first communication received for the individual at a first device to a second device at the current location of the individual based on, at least in part, the location tracking information, wherein the communication server includes an instant messaging server; and
   updating the communication server to reflect the current location of the individual and a telephone number of a telephone closest to the individual, including updating a status of an instant messaging client with the current location of the individual and an icon configured to initiate a call to the telephone number of the telephone closest to the individual when the icon is activated.

2. The method as claimed in claim 1, further comprising receiving, via an access control device, the user ID;
   receiving, via an access control panel, the location ID; and
   transmitting the user ID and the location ID to the access control server.

3. The method as claimed in claim 1, further comprising:
   receiving the current location of the individual in a communication client on the second device.

4. The method as claimed in claim 3, wherein the communication client is at least one of a telephone handset and a portable electronic device.

5. The method as claimed in claim 4, wherein the portable electronic device is at least one of a laptop computer, a pocket PC, a personal digital assistant, and a mobile phone.

6. The method of claim 1, wherein the first communication is a voice communication, wherein the voice communication is a telephone call and the telephone call is routed to a telephone handset closest to the individual.

7. The method of claim 1, wherein the first communication is a text communication, wherein the text communication is converted to speech and directed to a telephone handset closest to the individual.

8. The method of claim 3, wherein the communication is routed to the communication client on the second device.

9. The method of claim 1 further comprising routing, by the communication server, the first communication received for the individual to the second device at the current location of the individual based on, at least in part, the location tracking information.

10. The method of claim of claim 2 wherein the user ID is stored on one of a proximity card, a magnetic swipe card, and a barcode.

11. A computing system for routing a first communication to an individual, the systems comprising:
  a processor;
  a memory module coupled with the processor;
  a first software module executable by the processor and the memory module, wherein the first software module is configured to receive access control information from an access control server, wherein the access control information comprises a user ID and a location ID;
  a second software module executable by the processor and the memory module, wherein the second software module is configured to convert the access control information into location tracking information including an identity of the individual and a current location of the individual, the converting including converting the user ID into the identity of the individual and the location ID into the current location of the individual;
  a third software module executable by the processor and the memory module, wherein the third software module is configured to make the location tracking information available to one or more other entities including a communication server operative to route the first communication received for the individual at a first device to a second device at the current location of the individual based on, at least in part, the location tracking information, wherein the communication server includes an instant messaging server; and
  a fourth software module executable by the processor and the memory module, wherein the fourth software module is configured to update the communication server to reflect the current location of the individual and a telephone number of a telephone closest to the individual, including updating a status of an instant messaging client with the current location of the individual and an icon configured to initiate a call to the telephone number of the telephone closest to the individual when the icon is activated.

12. The system as claimed in claim 11, further comprising:
  an access control device configured to receive the user ID;
  an access control panel configured to receive the location ID; and
  the access control server configured to receive the user ID from the access control device and the location ID from the access control panel.

13. The system as claimed in claim 11, wherein the communication server includes a soft phone system.

14. The system as claimed in claim 11 further comprising a communication client on the second device configured to receive the current location of the individual.

15. The system of claim 14, wherein the communication client is at least one of a telephone handset and a mobile handset.

16. A computer program product for routing a first communication to an individual, the computer program product comprising a non-transitory computer usable medium having computer usable program code embodied therewith, the computer usable program code comprising computer usable program code configured to:
  receive access control information from an access control server, wherein the access control information comprises a user ID and a location ID;
  convert the access control information into location tracking information including an identity of the individual and a current location of the individual, the converting including converting the user ID into the identity of the individual and the location ID into the current location of the individual;
  make the location tracking information available to one or more other entities including a communication server operative to route the first communication received for the individual at a first device to a second device at the current location of the individual based on, at least in part, the location tracking information, wherein the communication server includes an instant messaging server; and
  update the communication server to reflect the current location of the individual and a telephone number of a telephone closest to the individual, including updating a status of an instant messaging client with the current location of the individual and an icon configured to initiate a call to the telephone number of the telephone closest to the individual when the icon is activated.

17. The computer program product of claim 16, wherein the communication server includes a soft phone system.

18. A computer program product residing on a non-transitory computer readable medium having a plurality of instructions stored thereon, which when executed by a processor, cause the processor to perform operations comprising:
  receiving, by a location tracking server, access control information from an access control server, wherein the access control information comprises a user ID and a location ID;
  converting, by the location tracking server, the access control information into location tracking information including an identity of an individual and a current location of the individual, the converting including converting the user ID into the identity of the individual and the location ID into the location of the individual;
  making, by the location tracking server, the location tracking information available to one or more other entities including a communication server operative to route a first communication received for the individual at a first device to a second device at the current location of the individual based on, at least in part, the location tracking information, wherein the communication server includes an instant messaging server; and
  updating the communication server to reflect the current location of the individual and a telephone number of a telephone closest to the individual, including updating a status of an instant messaging client with the current location of the individual and an icon configured to initiate a call to the telephone number of the telephone closest to the individual when the icon is activated.

* * * * *